UNITED STATES PATENT OFFICE.

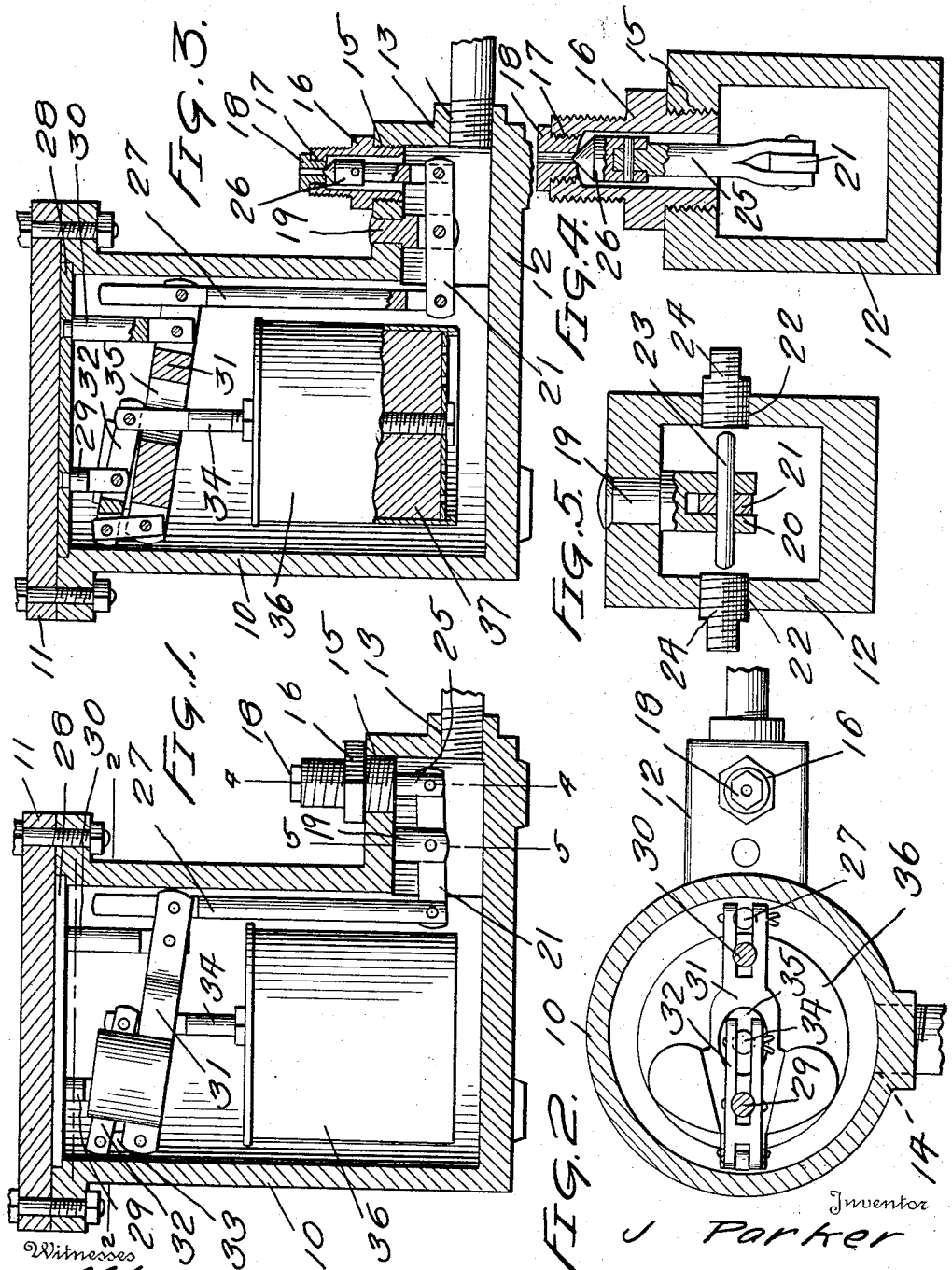

JAMES PARKER, OF OSWEGO, NEW YORK.

STEAM-TRAP.

1,172,727.  Specification of Letters Patent.  Patented Feb. 22, 1916.

Application filed March 30, 1915. Serial No. 18,139.

*To all whom it may concern:*

Be it known that I, JAMES PARKER, a citizen of the United States, residing at Oswego, in the county of Oswego, State of New York, have invented certain new and useful Improvements in Steam-Traps; and I do hereby declare the following to be a full, clear, and exact description of the invention, such as will enable others skilled in the art to which it appertains to make and use the same.

This invention relates to steam traps and particularly to the type adapted to automatically effect the removal of water of condensation from steam pipes without permitting the escape of steam.

The object of the invention resides in the provision of a steam trap embodying an improved construction whereby access to the valve for the purpose of assembling, repair and renewal is rendered easy, the construction being such that the pilot valve is located outside of the body casing of the trap and can be reached for the purposes named without removing any part of the body proper.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of the trap with the body casing in section; Fig. 2, a section on the line 2—2 of Fig. 1; Fig. 3, a vertical section of the trap; Fig. 4, a section on the line 4—4 of Fig. 1, and Fig. 5, a section on the line 5—5 of Fig. 1.

Referring to the drawings the improved trap is shown as comprising a body casing 10 having an open upper end closed by a removable cover 11. The casing 10 is provided adjacent its lower end with a reduced lateral extension 12 the outer end of which is provided with a threaded opening 13 for the attachment of the end of a steam pipe. The body 10 is provided adjacent its upper end with a threaded opening 14 in which is adapted to be secured an end of a steam pipe and whereby the trap is incorporated in a steam pipe line as will be obvious. The top of the extension 12 is provided with a threaded opening 15 in which is engaged a pilot valve casing 16, said casing projecting above the top of the extension 12. The upper end of the casing 16 is provided with a threaded opening 17 in which is screwed a tubular member 18 the inner end of which constitutes the seat for a pilot valve operating within the casing 16 and to be presently referred to.

Disposed within the extension 12 and depending from the top thereof is a post 19 the lower end of which is forked to form arms 20. Pivotally mounted between the arms 20 is a lever 21. The sides of the extension 12 are provided respectively with threaded openings 22 which are disposed in line with the pivotal support 23 of the lever 21. Engaged in the openings 22 respectively are plugs 24 which serve to prevent disengagement of the support 23 as will be apparent while the removal of said plugs will enable the support 23 to be applied and removed with facility. Further the use of the plugs 24 renders it unnecessary to positively secure the pivotal support 23 in place. Pivotally connected to the outer end of the lever 21 is a stem 25 which projects into the casing 16 and has detachably secured to its free end a valve 26 adapted under predetermined conditions to seat against the inner end of the member 18 and close the bore thereof. Pivotally connected to the inner end of the lever 21 is one end of a rod 27. Removably supported in the body 10 at the top thereof is a transverse bridge 28 from which depend posts 29 and 30. Pivotally connected with the lower end of the post 30 is a lever 31 one end of which is pivotally connected to the rod 27. Pivotally connected to the lower end of the post 29 is a lever 32 which has one end thereof connected to the end of the lever 31 remote from the rod 27 by means of a link 33. The end of the lever 32 adjacent the rod 27 is pivotally connected to a stem 34 which passes through an opening 35 in the lever 31 and carries on its lower end a float 36 which latter is preferably constructed of a hollow metal body having a filler of wood 37 to give same ample weight to hold the valve 26 closed under normal conditions and prevent elevation of the float 36 until the water of condensation has reached a predetermined level in the body casing 10.

Under normal conditions it will be obvious that the float 36 will by reason of its weight operating through the various levers hold the valve 26 closed. When the water of condensation in the body casing 10 has reached a predetermined level the float 36 will begin to rise and this movement of the float will be transmitted through the various levers to open the valve 26 when the pressure of the steam within the trap will force the water out through the bore of the member 18 without permitting the escape of any steam.

What is claimed is:—

In a steam trap the combination of a casing having a reduced lateral extension adjacent its lower end, a valve casing threaded in the top of said extension and having an opening in its upper end, a post depending from the top of said extension, a lever pivotally supported on the lower end of said post, the sides of said extension being provided with openings in line with the pivotal support of the lever, plugs threaded in said opening and serving as a stop to prevent longitudinal movement of the pivotal support of the lever, a stem pivoted to the outer end of said lever and movable in the valve casing, a valve mounted on the free end of said stem for controlling the opening in the valve casing, a float in the first named casing and connections between the float and the inner end of said lever whereby the movement of the float will determine the position of the valve.

In testimony whereof, I affix my signature, in the presence of two witnesses.

JAMES PARKER.

Witnesses:
ROBERT R. FISCHER,
JOHN P. BRADY.

Copies of this patent may be obtained for five cents each, by addressing the "Commissioner of Patents, Washington, D. C."